US011158154B2

(12) United States Patent
Achmueller et al.

(10) Patent No.: US 11,158,154 B2
(45) Date of Patent: Oct. 26, 2021

(54) GAMING SYSTEM AND METHOD PROVIDING OPTIMIZED AUDIO OUTPUT

(71) Applicant: IGT, Las Vegas, NV (US)

(72) Inventors: Klaus Achmueller, Kalsdorf bei Graz (AT); David Small, Moncton (CA); David Froy, Lakeville-Westmorland (CA); Stefan Keilwert, St. Josef (AT)

(73) Assignee: IGT, Las Vegas, NV (US)

( * ) Notice: Subject to any disclaimer, the term of this patent is extended or adjusted under 35 U.S.C. 154(b) by 157 days.

(21) Appl. No.: 16/169,627

(22) Filed: Oct. 24, 2018

(65) Prior Publication Data

US 2020/0134964 A1 Apr. 30, 2020

(51) Int. Cl.
*G06F 17/00* (2019.01)
*G07F 17/32* (2006.01)

(52) U.S. Cl.
CPC ...... *G07F 17/3206* (2013.01); *G07F 17/3216* (2013.01); *G07F 17/3227* (2013.01)

(58) Field of Classification Search
CPC ............. G07F 17/3206; G07F 17/3216; G07F 17/3227
See application file for complete search history.

(56) References Cited

U.S. PATENT DOCUMENTS 3,831,172 A 8/1974 Olliges et al.
4,339,798 A 7/1982 Hedges et al.
4,363,482 A 12/1982 Goldfarb
4,496,149 A 1/1985 Schwartzberg
4,582,324 A 4/1986 Koza et al.
4,618,150 A 10/1986 Kimura
4,624,459 A 11/1986 Kaufman
4,660,107 A 4/1987 Chippendale, Jr.
4,695,053 A 9/1987 Vazquez, Jr. et al.
4,974,857 A 12/1990 Beall et al.
5,096,195 A 3/1992 Gimmon
5,179,517 A 1/1993 Sarbin et al.
5,221,801 A 6/1993 Bruti et al.
5,242,163 A 9/1993 Fulton
5,275,400 A 1/1994 Weingardt et al.
5,342,047 A 8/1994 Heidel et al.
5,371,345 A 12/1994 LeStrange et al.
5,390,938 A 2/1995 Takeya
5,393,061 A 2/1995 Manship et al.
5,429,507 A 7/1995 Kaplan
5,430,835 A 7/1995 Williams et al.
5,449,173 A 9/1995 Thomas et al.
5,472,197 A 12/1995 Gwiasda et al.
5,668,996 A 9/1997 Radinsky
5,695,188 A 12/1997 Ishibashi
5,697,843 A 12/1997 Manship et al.
5,707,286 A 1/1998 Carlson
5,762,552 A 6/1998 Vuong et al.
(Continued)

OTHER PUBLICATIONS

Ear Anatomy, available prior to Oct. 24, 2018 (1 page).
Parts of the Ear, available prior to Oct. 24, 2018 (1 page).

*Primary Examiner* — Joseph Saunders, Jr.
(74) *Attorney, Agent, or Firm* — Neal, Gerber & Eisenberg LLP

(57) ABSTRACT

Electronic gaming machines that optimize audio during game play or otherwise based on a determined ear structure of a player, and in various embodiments also on a determined location of the player's ear in real-time.

19 Claims, 6 Drawing Sheets

(56) References Cited

U.S. PATENT DOCUMENTS

| | | | |
|---|---|---|---|
| 5,766,074 | A | 6/1998 | Cannon et al. |
| 5,772,509 | A | 6/1998 | Weiss |
| 5,792,972 | A | 8/1998 | Houston |
| 5,807,172 | A | 9/1998 | Piechowiak |
| 5,833,538 | A | 11/1998 | Weiss |
| 5,839,958 | A | 11/1998 | Ozarow |
| 5,848,932 | A | 12/1998 | Adams |
| 5,876,284 | A | 3/1999 | Acres et al. |
| 5,902,184 | A | 5/1999 | Bennett et al. |
| 5,908,354 | A | 6/1999 | Okuniewicz |
| 5,910,048 | A | 6/1999 | Feinberg |
| 5,967,894 | A | 10/1999 | Kinoshita et al. |
| 5,997,401 | A | 12/1999 | Crawford |
| 6,015,346 | A | 1/2000 | Bennett |
| D421,277 | S | 2/2000 | McGahn et al. |
| 6,056,642 | A | 5/2000 | Bennett |
| 6,062,979 | A | 5/2000 | Inoue |
| 6,071,192 | A | 6/2000 | Weiss |
| 6,084,169 | A | 7/2000 | Hasegawa et al. |
| 6,089,976 | A | 7/2000 | Schneider et al. |
| 6,089,978 | A | 7/2000 | Adams |
| 6,102,400 | A | 8/2000 | Scott et al. |
| 6,106,393 | A | 8/2000 | Sunaga et al. |
| 6,110,041 | A | 8/2000 | Walker et al. |
| 6,110,043 | A | 8/2000 | Olsen |
| 6,113,495 | A | 9/2000 | Walker |
| 6,117,009 | A | 9/2000 | Yoseloff |
| 6,126,165 | A | 10/2000 | Sakamoto |
| 6,142,875 | A | 11/2000 | Kodachi et al. |
| 6,146,273 | A | 11/2000 | Olsen |
| 6,146,276 | A | 11/2000 | Okuniewicz |
| 6,155,925 | A | 12/2000 | Giobbi et al. |
| 6,159,097 | A | 12/2000 | Gura |
| 6,174,233 | B1 | 1/2001 | Sunaga et al. |
| 6,174,235 | B1 | 1/2001 | Walker |
| 6,175,632 | B1 | 1/2001 | Marx |
| 6,181,800 | B1 * | 1/2001 | Lambrecht .............. H04S 1/002 381/17 |
| 6,217,448 | B1 | 4/2001 | Olsen |
| 6,238,288 | B1 | 5/2001 | Walker et al. |
| 6,241,612 | B1 | 6/2001 | Heredia |
| 6,254,481 | B1 | 7/2001 | Jaffe |
| 6,270,411 | B1 | 8/2001 | Gura et al. |
| 6,302,790 | B1 | 10/2001 | Brossard |
| 6,306,034 | B1 | 10/2001 | Sakamoto et al. |
| 6,309,299 | B1 | 10/2001 | Weiss |
| 6,309,301 | B1 | 10/2001 | Sano |
| 6,328,648 | B1 | 12/2001 | Walker et al. |
| 6,390,923 | B1 | 5/2002 | Yoshitomi et al. |
| 6,409,596 | B1 | 6/2002 | Hayashida et al. |
| 6,416,411 | B1 | 7/2002 | Tsukahara |
| 6,537,152 | B2 | 3/2003 | Seelig et al. |
| 6,544,122 | B2 | 4/2003 | Araki et al. |
| 6,554,703 | B1 | 4/2003 | Bussick et al. |
| 6,561,908 | B1 | 5/2003 | Hoke |
| 6,599,195 | B1 | 7/2003 | Araki et al. |
| 6,638,169 | B2 | 10/2003 | Wilder et al. |
| 6,656,046 | B1 | 12/2003 | Yoseloff et al. |
| 6,729,618 | B1 | 5/2004 | Koenig et al. |
| 6,769,985 | B1 | 8/2004 | Laakso et al. |
| 6,848,996 | B2 | 2/2005 | Hecht et al. |
| 6,935,955 | B1 | 8/2005 | Kaminkow et al. |
| 6,939,226 | B1 | 9/2005 | Joshi |
| 7,105,736 | B2 | 9/2006 | Laakso |
| 7,258,613 | B2 | 8/2007 | Lucchesi et al. |
| 7,355,112 | B2 | 4/2008 | Laakso |
| 7,666,098 | B2 | 2/2010 | Hecht et al. |
| 7,708,642 | B2 | 5/2010 | Hecht et al. |
| 7,867,085 | B2 | 1/2011 | Pryzby et al. |
| 7,892,091 | B2 | 2/2011 | Laakso et al. |
| 7,901,291 | B2 | 3/2011 | Hecht et al. |
| 8,025,562 | B2 | 9/2011 | Walker et al. |
| 8,025,566 | B2 | 9/2011 | Walker et al. |
| 8,029,353 | B2 | 10/2011 | Walker et al. |
| 8,029,362 | B2 | 10/2011 | Walker et al. |
| 8,077,195 | B2 | 12/2011 | Groβmann |
| 8,113,935 | B2 | 2/2012 | Walker et al. |
| 8,184,824 | B2 | 5/2012 | Hettinger et al. |
| 8,360,841 | B2 | 1/2013 | Walker et al. |
| 8,435,105 | B2 | 5/2013 | Paulsen |
| 8,485,881 | B2 | 7/2013 | Griswold et al. |
| 8,500,562 | B2 | 8/2013 | Walker et al. |
| 8,591,308 | B2 | 11/2013 | Hoffman et al. |
| 8,690,662 | B2 | 4/2014 | Walker et al. |
| 8,702,517 | B2 | 4/2014 | Walker et al. |
| 8,758,131 | B2 | 6/2014 | Decker et al. |
| 8,777,744 | B2 | 7/2014 | Basallo et al. |
| 8,814,649 | B2 | 8/2014 | Walker et al. |
| 8,821,266 | B2 | 9/2014 | Nicely |
| 8,992,298 | B2 | 3/2015 | Walker et al. |
| 8,992,299 | B2 | 3/2015 | Walker et al. |
| 9,033,799 | B2 | 5/2015 | Decker et al. |
| 9,039,410 | B2 | 5/2015 | Walker et al. |
| 9,582,970 | B2 | 2/2017 | Rosenblatt |
| 9,630,106 | B2 | 4/2017 | Decker et al. |
| 10,016,673 | B1 | 7/2018 | Milligan et al. |
| 10,134,228 | B2 | 11/2018 | McIntyre et al. |
| 10,134,230 | B2 | 11/2018 | Okada et al. |
| 10,163,295 | B2 | 12/2018 | Miura |
| 10,805,757 | B2 * | 10/2020 | Lee ......................... G06T 7/149 |
| 2002/0077165 | A1 | 6/2002 | Bansemer et al. |
| 2003/0073490 | A1 | 4/2003 | Hecht et al. |
| 2003/0100359 | A1 | 5/2003 | Loose et al. |
| 2004/0023709 | A1 | 2/2004 | Beaulieu et al. |
| 2005/0282631 | A1 * | 12/2005 | Bonney ................... A63F 13/00 463/35 |
| 2008/0113716 | A1 | 5/2008 | Beadell et al. |
| 2012/0115608 | A1 | 5/2012 | Pfeifer et al. |
| 2012/0183161 | A1 * | 7/2012 | Agevik ................... H04S 7/302 381/303 |
| 2013/0208898 | A1 * | 8/2013 | Vincent ................... A63F 13/54 381/17 |
| 2015/0213691 | A1 | 7/2015 | Dunn |
| 2015/0243124 | A1 | 8/2015 | Decker et al. |
| 2016/0092156 | A1 | 3/2016 | Miura |
| 2016/0180644 | A1 | 6/2016 | Idris et al. |
| 2017/0013117 | A1 * | 1/2017 | Deleuze ............. G06K 9/00248 |
| 2017/0287287 | A1 | 10/2017 | Froy et al. |
| 2017/0294072 | A1 | 10/2017 | Achmuller et al. |
| 2018/0040190 | A1 | 2/2018 | Keilert et al. |
| 2018/0078854 | A1 | 3/2018 | Achmueller et al. |
| 2018/0089935 | A1 | 3/2018 | Froy, Jr. |
| 2018/0130283 | A1 | 5/2018 | Froy et al. |
| 2018/0132764 | A1 * | 5/2018 | Jain ........................... G06T 7/80 |
| 2019/0087972 | A1 * | 3/2019 | Huttunen .................. G06T 7/60 |

* cited by examiner

GAMING SYSTEM AND METHOD PROVIDING OPTIMIZED AUDIO OUTPUT

BACKGROUND

The present disclosure relates to gaming systems, and more particularly gaming machines that enable the play of wagering games. Such gaming machines typically require the player to place a wager to activate a play of the primary game. Many of these gaming machines may determine and provide the awards based on the player obtaining a winning symbol or symbol combination and on the amount of the wager. These gaming machines may also include secondary games that provide one or more additional awards to the player. These gaming machines may output various audio (including music and/or spoken words) associated with the plays of the primary and secondary games. These gaming machines may also output various audio before and after the plays of the primary and secondary games. These gaming machines may include an input device that enables a player to manually adjust the volume of the audio outputted by the gaming machine.

BRIEF SUMMARY

Various embodiments of the present disclosure provide a gaming system and method that optimizes audio outputted by the gaming system to provide enhanced player interaction. Various embodiments of the gaming system and method determine and use the structure of one or more of a player's ears to optimize the audio outputted by the gaming system.

Various embodiments of the present disclosure provide a method for operating a gaming system, the method including determining a structure of a player's ear of a player of an electronic gaming machine, and outputting audio based on the determined structure of the player's ear.

Various other embodiments of the present disclosure provide an electronic gaming machine including: a cabinet; an object sensor supported by the cabinet; a sound producing device supported by the cabinet; a processor; and a memory device that stores a plurality of instructions, which when executed by the processor, cause the processor to: determine a structure of a player's ear of a player of the electronic gaming machine; operate with the object sensor to determine a location of the player's ear; and operate with the sound producing device to output audio based on the determined structure of the player's ear and the determined location of the player's ear.

Various other embodiments of the present disclosure provide a gaming system including: a player chair including a sound producing device; and an electronic gaming machine including: a cabinet; an object sensor supported by the cabinet; a sound producing device supported by the cabinet; a processor; and a memory device that stores a plurality of instructions, which when executed by the processor, cause the processor to: determine a structure of a player's ear of a player on the player chair; operate with the object sensor to determine a location of the player's ear; and operate with the sound producing devices of the player chair and of the electronic gaming machine to output audio based on the determined structure of the player's ear and the determined location of the player's ear.

Additional features are described in, and will be apparent from, the following Detailed Description and the figures.

DETAILED DESCRIPTION

Figure 1:
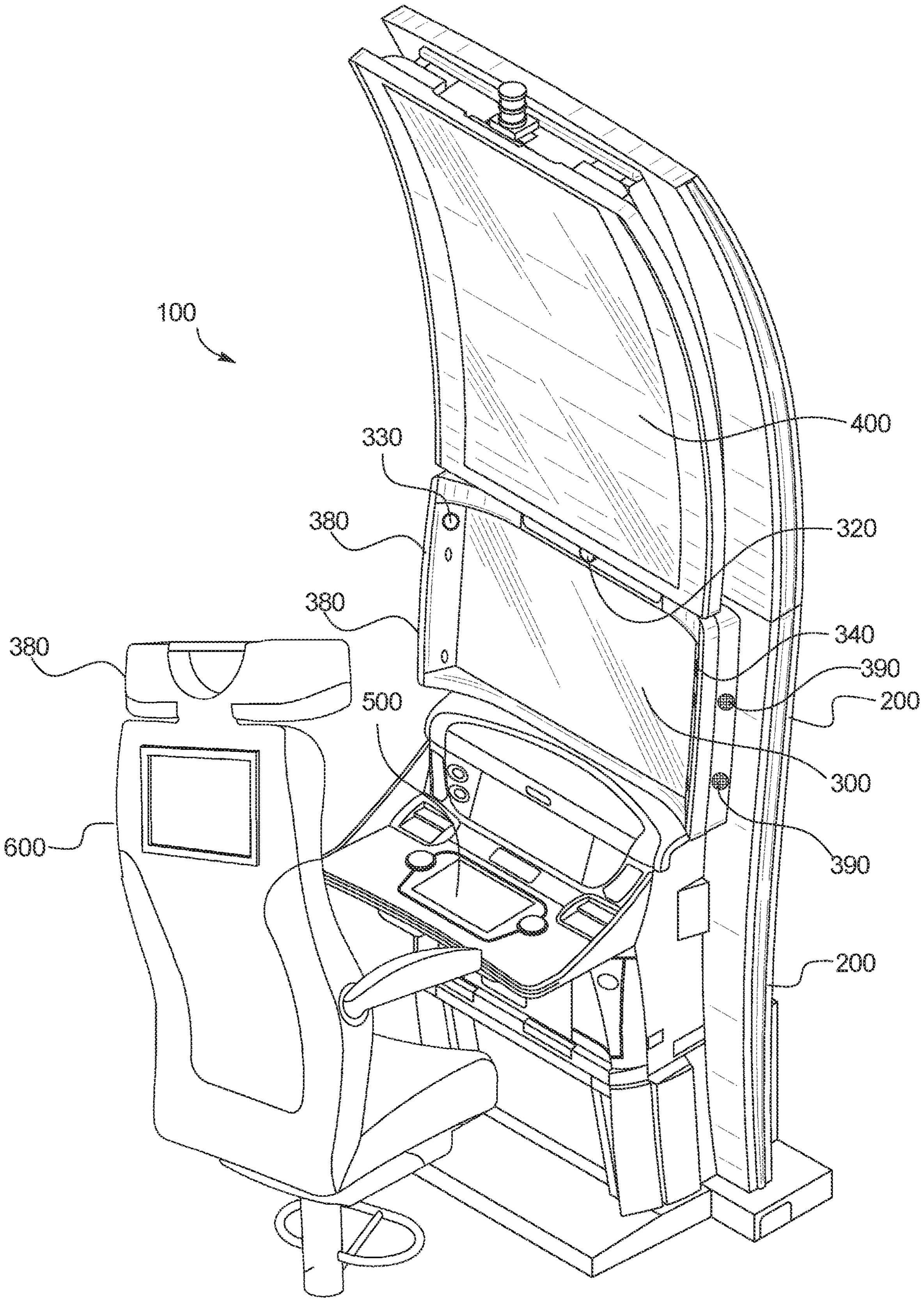
FIG. 1 is a front perspective view of one example embodiment of a gaming system of the present disclosure that includes an electronic gaming machine and an associated player chair.

In various embodiments, the present disclosure provides gaming systems and methods that automatically adjust audio outputted by the gaming system based on a structure of one (or both) of the ears of a player and the locations of one (or both) of the ears of the player. In various embodiments, the gaming system includes an electronic gaming machine ("EGM"), and in various other embodiments the present disclosure includes and EGM and a player chair. For brevity and clarity, and unless specifically stated otherwise, the term "EGM" is used herein to refer to an electronic gaming machine (such as but not limited to a slot machine, a video poker machine, a video card machine, a video lottery terminal (VLT), a video keno machine, a video bingo machine, or a sports betting terminal).

The structure of an ear of a player as described herein is meant to include one or more visible outer parts of a person's ear such as but not limited to: (1) the helix or pinna; (2) the scapha; (3) the rook snug; (4) the conch; (5) the transverse lobe; (6) the lobe; (7) the anti-lobe; (8) the anti-tragus; (9) the tragus; (10) the daith; (11) the forward helix; (12) the industrial or scaffold; (13) the crura of the antihelix; (14) the intertragic incisure; and/or (15) outer ear canal. It should be noted that different medical references refer to different parts of the outer structure of the human ear differently, and that this list is not meant to be an exclusive list. It should be appreciated that in various embodiments of the present disclosure, the ear structure is meant to include one of these structures, but can include more than one of these structures.

In various embodiments, the gaming system, upon an occurrence of an audio adjustment determination, automatically makes an adjustment to the audio outputted by the gaming system. This automatic audio adjustment feature of the present disclosure can be employed in association with the audio outputted, such as, but not limited to: (1) in association with a play of a primary game (such as a primary wagering game); (2) in association with a play of a secondary game; (3) before a play of a primary game; (4) before a play of a secondary game; (5) after a play of a primary game; (6) after a play of a secondary game; (7) between two plays of primary games; (8) between two plays of secondary games; (8) between a play of a primary game and a play of a secondary game; and/or (8) between a play of a secondary game and a play of a primary game.

In various embodiments, the automatic audio adjustment feature of the present disclosure can be employed in association with a gaming system that provides: (1) a monetary player's credit balance where the player's balance, wagers, and any awards are displayed as an amount of monetary credits or currency; or (2) a non-monetary player's credit balance where the player's balance, wagers, and any awards provided to such a player are for non-monetary credits, promotional credits, and/or player tracking points or credits.

In various embodiments, the automatic audio adjustment feature of the present disclosure is configured to be employed by a gaming system in real time and on a continuous basis, or in real time at regular defined intervals (such as but not limited to every quarter second, every half second, or every second).

In the various embodiments where the gaming system includes an EGM and a player chair, the adjustments to the audio outputted by the gaming system can be made by sound producing devices of the EGM and/or the player chair. In the embodiments where the gaming system includes an EGM and no player chair, the adjustments to the audio outputted by the gaming system are made by the sound producing devices of the EGM (or sound producing devices configured to operate with the EGM). In other embodiments, the adjustment can be made by sound producing devices otherwise adjacent to the EGM.

The present disclosure takes into account that players of EGMs are typically of a wide variety of different ages, heights, and structures. More particularly, the present disclosure takes into account that players will have different ear structures, and that the specific ear structures of each player will in part determine how the player hears audio outputted by the gaming system (including the EGM and/or the player chair).

The present disclosure also takes into account that a player will typically shift or otherwise physically move many times when at an EGM such as before, during, and after each game play at the EGM. More particularly, the present disclosure takes into account that as a player moves, the location of their ear structures will typically move relative to the gaming system.

The present disclosure also contemplates that the audio outputted by the gaming system and the audio heard by the player will before, during, and after game play at an EGM will affect the player's gaming experience provided by the gaming system.

The gaming system of various embodiments of the present disclosure: (1) determines the structure of one (or both) of the player's ears; (2) determines the location of one (or both) of the player's ears on a real time basis; and (3) responsive to each occurrence of an audio adjustment determination employs an automatic audio adjustment feature to make one or more adjustments to the audio outputted by the gaming system on a real time basis. In various embodiments, the occurrences of the audio adjustment determinations are based on: (a) the determined structure of one (or both) of the player's ears; (b) the determined location(s) (or changes to the location(s)) of one (or both) of the player's ears; and (c) the audio being outputted and/or to be outputted by the gaming system (based on the game play occurring or other activity provided by or to be provided by the gaming system).

The gaming system of various embodiments of the present disclosure thus outputs audio with sound characteristics that are expected to be more engaging and pleasing to a player (even though such audio may not be as ideal, as well-suited, as engaging, or as pleasing to another player).

It should thus be appreciated that the present disclosure provides advancements to gaming systems, EGMs, and player chairs within gaming environments, and more particularly, audio enhancements to gaming systems operating within the gaming environments. It should also be appreciated that the present disclosure also provides enhancements to gaming system audio processing, and computing enhancements of gaming systems.

In various embodiments, the gaming system can determine the structure(s) of one (or both) of a player's ears in a variety of suitable different manners. In various embodiments, after a player begins a gaming session at an EGM (such as by transferring a monetary value onto the EGM or identifying the player to the EGM using player tracking information), the EGM determines the structure(s) of one (or both) of the player's ears using suitable sensors (i.e., to determine player ear structure data). The EGM can then use such determined player ear structure data to employ an automatic adjustment feature to make adjustments to the audio outputted by the gaming system based in part on such player ear structure data. In various embodiments, the EGM uses the determination to create suitable player ear structure data that the EGM can subsequently use for the player, and in various embodiments that the EGM can send to one or more remote devices (such as one or more remote player data servers) with an identification of the player (if known) for storage and subsequent use by the EGM and other EGMs.

In various other embodiments, when a player begins a gaming session at an EGM, if the player has identified him or herself (such as by using a player tracking card or otherwise), the EGM communicates with one or more remote devices (such as one or more remote player data servers) to request data regarding the structure(s) of one (or both) of the player's ears. If this player ear structure data is available from such remote player data server(s), the remote device(s) can send such player ear structure data to the EGM, and the EGM can then use such received player ear structure data to employ an automatic audio adjustment feature to make adjustments to the audio outputted by the gaming system based in part on such player ear structure data. This example embodiment enables an EGM that does not include any ear structure determination sensors to employ an automatic audio adjustment feature to make changes to the audio outputted by the gaming system on a real time basis based on the occurrences of audio adjustment determinations that are based on: (a) the received player ear structure data; (b) the determined locations of one (or both) of the player's ears; and (c) the audio being outputted or to be outputted by the gaming system (based on the game play occurring or other activity provided by or to be provided by the gaming system).

In various other embodiments, when a player begins a gaming session at an EGM, if the player has identified him or herself (such as by using a player tracking card or otherwise), the EGM communicates with one or more remote devices (such as one or more remote player data servers) to request data regarding the structure(s) of one (or both) of the player's ears. If this player ear structure data is not available from such remote device(s), the EGM can then determine the player ear structure(s) and create the player ear structure data to employ an automatic audio adjustment feature to make adjustments to the audio outputted by the gaming system based in part on such player ear structure data. It should be appreciated that in such embodiments, the EGM can be configured to send this player ear structure data to one or more remote devices (such as one or more remote player data servers) with an identification of the player (if known) for subsequent use.

In various embodiments, after a player begins a gaming session at an EGM (such as by transferring a monetary value onto the EGM or identifying the player to the EGM using player tracking information), the EGM begins to determine the location(s) of the one (or both) of the player's ears using suitable sensors such as suitable head tracking sensors and/or ear tracking sensors to determine the location(s) of one (or both) of the player's ears on a continuous or regular basis. These determinations continue on a real time basis as the player moves during game play (or otherwise) to enable the gaming system to make adjustments to the audio outputted by the gaming system in real time.

It should be appreciated that the present disclosure contemplates that determining the structures of one or more of a player's ears can be done in a variety of different manners. For example, in certain such embodiments, the EGM uses these sensors to determine one or more specific structures of the player's ear such as the pinna of the player's ear to determine a focal point for which the audio outputted by the EGM should be directed. Once this structure(s) of the ear(s) of the player is/are identified using the sensors, sound characteristics of the audio outputted by the gaming system may be adjusted according to various criterion to provide an optimal and more enjoyable gaming experience for the specific player. It should be appreciated that the present disclosure contemplates that the audio outputted by the EGM can be based on the player's ear structure(s) alone, and additionally based on respective locations of those structure relative to the sound producing devices (such as but not limited to the sound producing devices of the EGM and/or the player chair).

Referring now to FIGS. 1, 2, 3, and 4, one example gaming system of the present disclosure is generally illustrated, and includes an EGM indicated by numeral 100 and a player chair indicated by numeral 600. This example EGM 100 illustrated in FIGS. 1, 2, 3, and 4 generally includes a cabinet 200 that supports a plurality of output devices and a plurality of input devices of the EGM 100, among other components.

Figure 4:
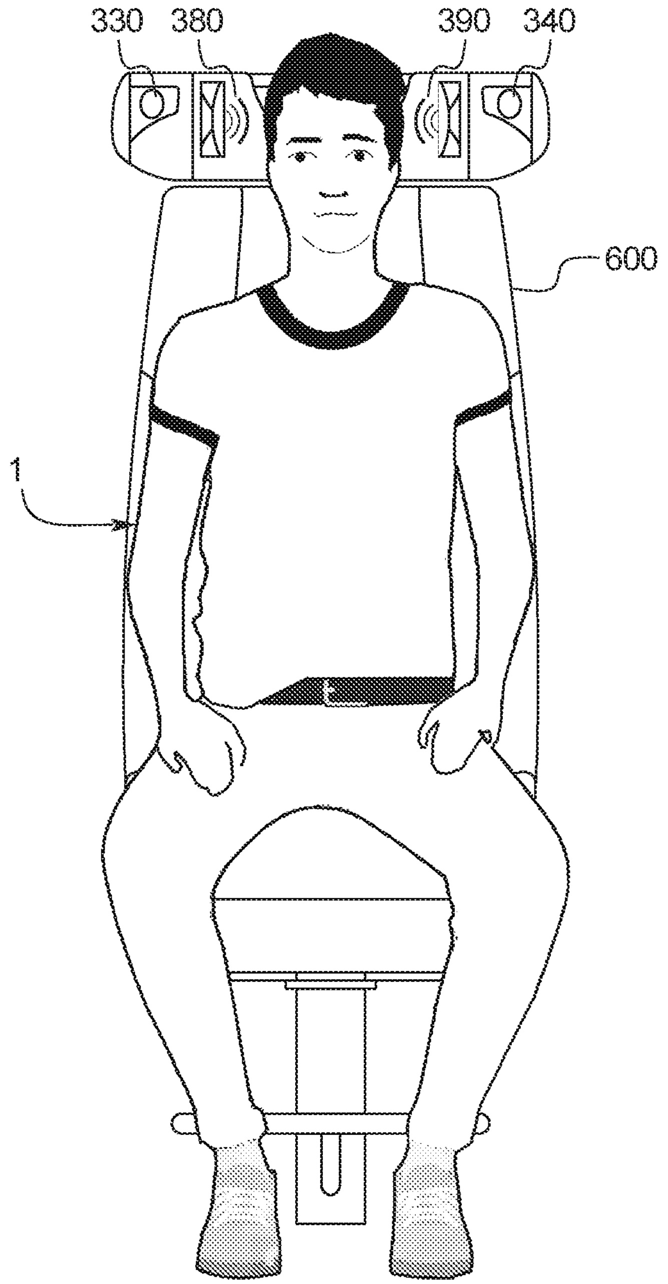
FIG. 4 is a front view of a player seated on the player chair of the gaming system of FIG. 1.

In this illustrated example embodiment, the plurality of output devices include: (1) a first (intermediate) display device 300; (2) a second (upper) display device 400 positioned above the first display device 300; and (3) a third (lower) display device 500 positioned below the first display device 300. The plurality of output devices further include a plurality of sound producing devices and particularly a plurality of speakers 380 and 390 located at various positions within (or substantially near to) cabinet 200 of the EGM 100. Certain of the speakers 380 and 390, for example, are integrated within the cabinet 200. Certain other speakers 380 and 390 can be integrated into the player chair 600 such as within the headrest of the player chair 600 as shown in FIG. 4. Thus, one or more of the speakers may not be physically attached to the EGM 100. These speakers are configured to output audio for a player (such as player 1 in FIG. 4) associated with plays of games, game outcomes, awards (such as primary and secondary games awards or other game outcome awards), and other functionality and/or information displayed or otherwise provided by the display devices of the EGM 100.

The example EGM 100 shown in FIGS. 1, 2, 3, and 4 also includes a plurality of player input devices. In this illustrated example embodiment, the plurality of player input devices enable the player 1 to play one or more primary wagering games and one or more secondary games provided by the EGM 100. Such player input devices can also include one or more of the input devices described below in the second section of this detailed description. These player input devices are physically activatable by the player to enable the player to make inputs into the EGM 100.

Figure 3:
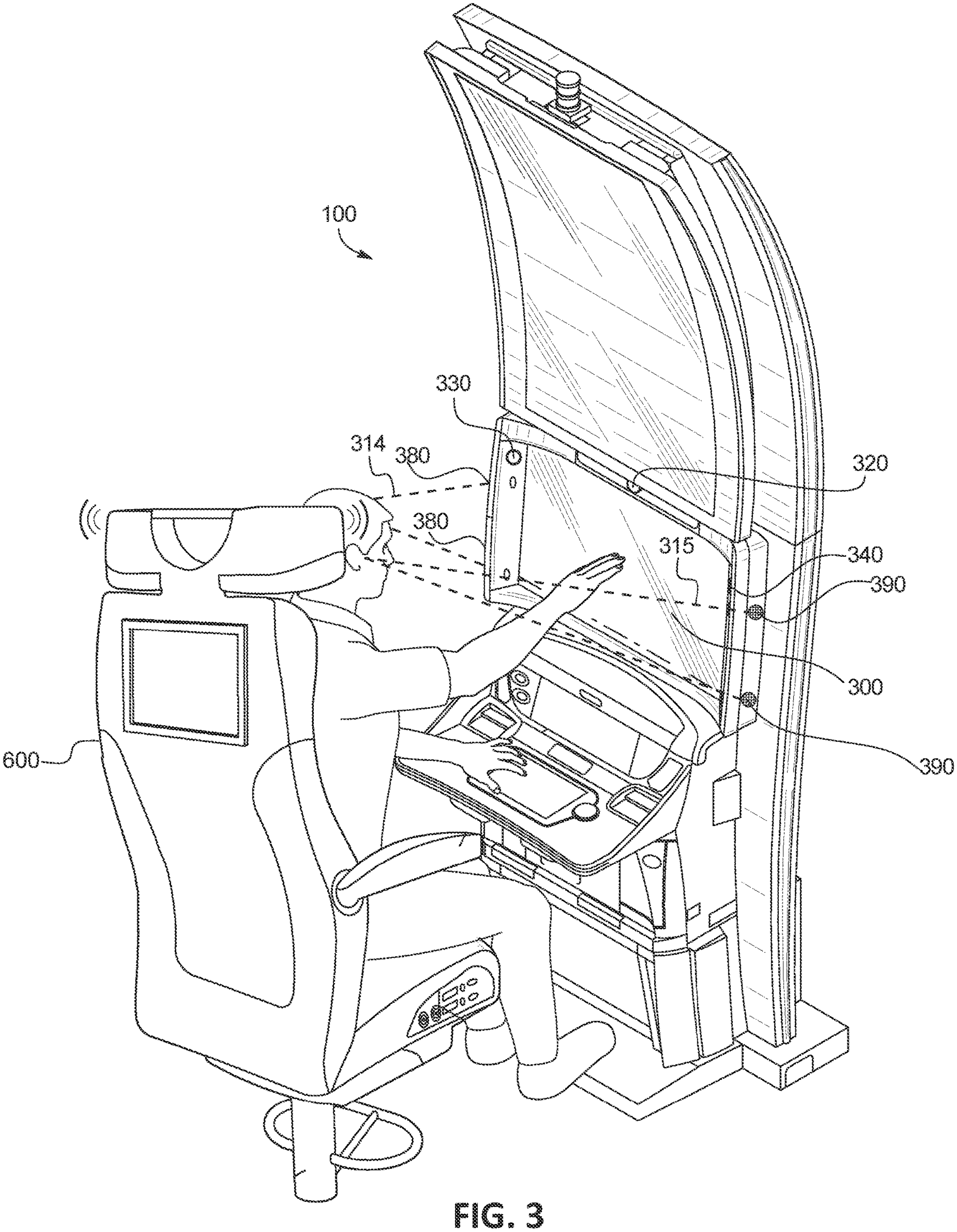
FIG. 3 is a front perspective view of the gaming system of FIG. 1, showing in phantom ear structure tracking zones provided by the electronic gaming machine of FIG. 1.

These output devices and input devices are configured such that a player may operate the EGM 100 while standing or sitting, but preferably operates the EGM while the player is sitting (e.g., such as player 1 sitting on the player chair 600) in front of the EGM 100 such that the player's head is approximately at the same height as the first display device 300 (as generally shown in FIG. 3).

In various embodiments of the present disclosure, the EGM of the present disclosure may include one or more of the following: (1) the first display device 300 configured to display gameplay functionality, which in some embodiments may include three-dimensional ("3D") images, to the player; (2) a player ear locator 320 (including one or more sensors such as cameras) configured to track the movement of the ears of the player; and (3) one or more processors and memory devices that co-act with the above mentioned components to provide the optimized audio output from the EGM 100. It should be appreciated that the first display device 300 and the player ear locator 320, may each be individually configured or may alternatively be configured to operate with the one or more processors and memory devices to provide each of their designated functions described herein. The player ear locator 320 may be individually configured to track the movement of the ears of the player, or may be configured to operate with the one or more processors and memory devices to track the movement of the ears of the player. Thus, for purposes of this disclosure and for brevity, each of these devices are sometimes discussed as performing such tasks individually or operating with the one or more processors and memory devices to perform such task, and such descriptions are not intended to limit the present disclosure to either configuration.

It should be appreciated that this example embodiment includes a player ear locator 320 that is configured to track and determine the locations of the player's ears on a real time basis. It should further be appreciated that in alternative embodiments, the player ear locator can include or co-act with a player head locator and/or a player eye locator to determine the location of the player's ears on a real time basis.

It should thus further be appreciated that in alternative embodiments, in addition to a player ear locator, the EGM includes a player head locator and/or a player eye locator to also determine the location of the head and/or eyes of the player, to verify the determination of the locations of the player's ears on a real time basis.

In this illustrated example embodiment, the player ear locator 320 of the EGM 100 is configured to track or determine the position(s) of one (or both) of the player's ears in front of the first display device 300, and includes a plurality of sensors such as cameras 330 and 340 supported by the cabinet 200 and positioned adjacent to the first display device 300. The cameras 330 and 340 are configured to obtain one or more images of the player's ears. In this illustrated embodiment, one camera 330 is positioned directly to the right of the display device 300 (looking forward toward player 1) and one camera 340 is positioned directly to the left of the display device 300 (looking forward toward player 1). In this illustrated embodiment, the plurality of cameras 330 and 340 are positioned adjacent to the upper right hand corner of the display device 300 and the other of the plurality of cameras is positioned adjacent to the upper left hand corner of the display device 300. It should be appreciated that in an alternative embodiment, the cameras are to be positioned adjacent to the lower right hand corner of the first display device 300 and positioned adjacent to the lower left hand corner of the first display device 300. It should also be appreciated that in other alternative embodiments, the cameras 330 and 340 can be otherwise alternatively positioned in accordance with the present disclosure, such as in upper left and right portions of the player chair 600, respectively. It should also be appreciated that in other alternative embodiments, the EGM can include only one such camera or more than two such cameras in accordance with the present disclosure.

In various embodiments, the cameras 330 and 340 are or include three-dimensional cameras having depth map creation capabilities, such as time of flight ("TOF") depth camera sensors, positioned at the two opposite sides of the first display device 300 and focused inwardly somewhat towards each other. This configuration enables the cameras 330 and 340 to track objects such as one or more of the player's ears in the relatively narrow right and left player ear tracking zones 314 and 315 (generally indicated in phantom in FIG. 3), respectively. In various embodiments, the TOF depth camera sensors make the EGM less prone to occlusions. In various embodiments, the TOF depth cameras also deliver point clouds that can be quickly analyzed and used by the processor(s) of the EGM to make the necessary determinations. It should be appreciated that other suitable depth sensors (other than TOF sensors) may be employed in accordance with the present disclosure.

In various embodiments, the EGM 100 uses the image data provided by the player ear locator 320 (including the cameras 330 and 340) to determine the position(s) of the player's ears in the right and left player ear tracking zones 314 and 315 in real time as the player moves the player's head during game play or otherwise. In certain embodiments, the EGM 100 creates the object depth images using point clouds provided by three dimensional cameras (e.g., the TOF depth cameras) and merges these point clouds to create one optimized point cloud that represents the object(s) such as the player's ears in the right and left player ear tracking zones 314 and 315. This provides a high degree of accuracy and a relatively large coverage area (than would a one camera system).

In various embodiments, the EGM 100 also obtains and uses the image data provided by the cameras 330 and 340 to determine the structures of one (or both) of the ears of the player (when the player's ears are within the ear tracking zones 314 and 315 within the field of view of the first display device 300). In various embodiments, the EGM 100 uses this image data provided by the cameras 330 and 340 to determine and create the player ear structure data mentioned above. It should be appreciated that in various embodiments, this player ear structure data only needs to be determined once, and then can be used repeatedly by the gaming system. It should further be appreciated that in various embodiments, this player ear structure data can be initially determined, and then can be updated one or more times by the EGM 100 as the EGM 100 obtains better images of one (of both) of the player's ears as the player's turns the player's head during game play or otherwise, and thus enables the cameras 330 and 340 to obtain better or clearer images of the specific structures of one (or both) of the player's ears.

In certain embodiments, the cameras 330 and 340 may include a stereo pair of cameras that are generally pointed at each of the player's ears to determine the real time ear structure images and data as the player moves about during game play or otherwise.

In various embodiments, facial recognition technology, infrared depth map algorithms, and/or interference patterns may be used to determine the player head movement and/or ear movement and positioning in real time. In other words, the EGM 100 may determine the size, shape, and real time positioning of the player's ears in three-dimensional space (i.e., the xyz coordinate relative to the first display device 300). The EGM 100 may then use the image data provided by the cameras 330 and 340 to determine movements by the player's head and ears, again, in real time.

In other various embodiments, the EGM 100 obtains and uses the image data provided by one (or more) sensors other than or in addition to the cameras 330 and 340 to determine the structures and/or movements of one (or both) of the ears of the player.

In certain embodiments, the EGM 100 may include one or more camera sync cables (not shown) that sync the cameras 330 and 340 to enhance the accuracy of the determination of the position(s) of the player's ear(s) in the right and left player ear tracking zones 314 and 315. It should be appreciated that the image data from the multiple cameras can be synced in other suitable manners in accordance with the present disclosure. For example, in other embodiments, the cameras 330 and 340 may feed image data to the processor(s) of the EGM 100 which receive the image data and assemble the synchronization thereof based on receipt time of data delivery and/or image data in real time. Notwithstanding, the player ear locator 320 including the cameras 330 and 340 (whether the cameras are integrated into the cabinet 200, the player chair 600, or both) may work individually or collectively to determine the movements of the player's ears during gameplay (or otherwise) while the player is seated on the player chair in front of the EGM 100.

In the illustrated example embodiment of the EGM 100 of the present disclosure shown in FIGS. 1, 2, 3, and 4, the cameras 330 and 340 are positioned directly to the right and left of first display device 300 (and additionally and/or alternatively within the player chair 600 associated with the EGM 100). It should be appreciated that in alternative embodiments of the present disclosure, the cameras 330 and 340 may be placed in any other suitable locations.

It should be noted that the player ear locator 320 (including the cameras 330 and 340) may co-act with other object sensors (not shown) to identify characteristics of one (or both) of the ears of the player to perform the various functionality disclosed herein.

In this example embodiment, the gaming system and specifically the EGM 100 shown FIGS. 1, 2, 3, and 4, after determining the structure of one (or both) of the player's ears (such as by using the cameras 330 and 340 of the player ear locator 320), and after creating the player ear structure data, will use such player ear structure data along with real time determinations of the location(s) of one (or both) of the player's ears on a real time basis to employ the automatic audio adjustment feature to make changes to the audio outputted by the gaming system on a real time basis based on the occurrences of audio adjustment determinations. These audio adjustment determinations are based on: (a) the determined structure(s) of one (or both) of the player's ears; (b) the determined location(s) of one (or both) of the player's ears; and (c) the audio being outputted and to be outputted by the gaming system (based on the game play occurring or other activity provided by or to be provided by the gaming system). Based on each audio adjustment determination, the gaming system including the sound producing devices of the EGM 100 and/or the player chair 600 will make one or more adjustments in real time to enhance the audio outputted by such sound producing devices and received by the ears of the player.

For example, the adjustments based on the player's specific ear structure(s) can include but are not limited to one or more: (1) changes in the direction(s) of the focal points of the audio; (2) changes in volume of the audio; (3) changes in tone of the audio; (4) changes in pitch of the audio; (5) changes in frequency, wavelength, or amplitude of the audio; (6) changes in bass level of the audio; (7) changes in treble level; (8) changes to one or more of the musical instruments of the audio; (9) changes to one or more of spoken words of the audio; (10) changes to the equalization of the audio; (11) changes to the sound pressure level (SPL) of the audio; (12) changes to the sonic texture of the audio; (13) changes to a duration of the audio; (14) ambient noise cancellation sounds; (15) change in the balance of the audio; and/or (16) changes in propagation of the audio via the speakers.

In various example embodiments, the adjustments to the audio are based on the player's specific ear structure(s) also relate to, are synchronized with, and/or are based on one or more images displayed by one or more display devices of the EGM 100 such as but not limited to: (1) 2D displayed images; and/or (2) 3D displayed images.

In various example embodiments, the adjustments to the audio are based on the player's specific ear structure(s) also relate to and/or are based on one or more player preference(s). In various such embodiments, the player preference(s) is/are obtained directly from the player by the EGM 100. In various other embodiments, the player preference(s) is/are obtained indirectly from the player by the EGM 100 by accessing a player profile obtained from one or more remote devices such as one or more remote player tracking servers.

In various example embodiments, when listening to audio (e.g., audio associated with a particular game, game event sounds, 2D or 3D displayed images, advertisements, etc.) outputted through the speakers 380 and 390 of the EGM 100, varying players of different ages, heights, configurations, may have vastly different listening experiences, especially when the audio is generally not "customized" to the player (e.g., with regard to equalization (EQ) settings, volume, and the like) and the physical positions of the speakers 380 and 390 is generally static (not movable) within the EGM 100 and/or player chair 600 associated with the EGM 100. Moreover, as the player moves on the player chair 600 while engaged in gameplay (or otherwise) at the EGM 100, the player may inadvertently move away from an optimal listening location (i.e., a physical position) that may hinder their ability to directly hear the audio being generated by the speakers 380 and 390 of the EGM 100 and/or the player chair 600. Accordingly, by using the determined ear structure(s) of the player and the determined position(s) of the player's ears, the gaming system can improve the audio acoustical characteristics produced by the speakers 380 and 390 of the EGM 100 and/or the player chair 600 to produce an enhanced gaming experience for the player.

In one example embodiment, camera(s) 330 (which may include one or more cameras integrated into a left side of the first display device 300 and/or one or more cameras integrated into a left side of the player chair 600) may be substantially pointed to capture imaging information from a left portion of the player's head. This imaging information may be used by a processor of the EGM 100 to direct a focal point of audio outputted by speakers 380 (which may include one or more speakers integrated within a left side of the cabinet 200 and/or one or more speakers integrated within a left side of the player chair 600) substantially toward the player's left ear and based on the structure of that ear of the player. Similarly, camera(s) 340 (which may include one or more cameras integrated into a right side of the first display device 300 and/or one or more cameras integrated into a right side of the player chair 600) may be substantially pointed to capture imaging information from a right portion of the player's head. This additional imaging information may be used by the processor of the EGM 100 to direct a focal point of audio outputted by speakers 390 (which may include one or more speakers integrated within a right side of the cabinet 200 and/or one or more speakers integrated within a right side of the player chair 600) substantially toward the player's right ear and based on the structure of that ear of the player. In this way, the actual specific structures of the player ears (or at least some portion(s) of the ears of the player) are used to adjust the focal point of the audio produced by the respective speakers 380 and 390 using various software-based (e.g., EQ settings, fading, etc.).

In various alternative embodiments, the present disclosure further contemplates mechanically repositioning and redirecting one or more of speakers themselves using electronic motors and/or adjusting a cone or diaphragm of the speakers 380 and 390 based on the player ear structure data and ear location(s).

In various alternative embodiments, the present disclosure contemplates using other devices such a devices adjacent to the EGM and/or player chair to output audio based on the player ear structure data and ear location(s).

In various alternative embodiments, the present disclosure further contemplates selecting one or more of a plurality or array of speakers based on the player ear structure data and ear location(s). In certain such embodiments, only certain of the speakers are employed to produce the audio. For instance, in various alternative embodiments, the present disclosure contemplates selecting which of a plurality of differently positioned and/or directed speakers to employ based on the player ear structure data and ear location(s).

In various alternative embodiments, the present disclosure contemplates using ultrasound speakers to make adjustments to the audio based on the player ear structure data and ear location(s).

In various alternative embodiments, the present disclosure contemplates making adjustments to the audio produced by the gaming system based on the player ear structure data and ear location(s) as well as ambient noise in the gaming environment determined by gaming system or sent to the gaming system.

It should further be appreciated that, beyond the focal point and other audio characteristics of the audio sound waves outputted by the speakers 380 and 390 described above, other sound characteristics or properties may be adjusted according to various other criterion.

In various example embodiments, the audio sound characteristics may additionally be adjusted by a channel separation of various sounds output through the respective speakers 380 and 390 and/or by a synchronization of the sound output of one of the respective speakers 380 and 390 with another one. For example, the audio output of speakers 380 and 390 of the player chair 600 may in some cases be synchronized to the speakers 380 and 390 of the EGM 100. In other cases, the audio output of speakers 380 and 390 of the player chair 600 may be delayed relative to the audio output of the speakers 380 and 390 of the EGM 100 to create a "concert hall" type effect or to project sound into a perceived front and/or in back position ahead or behind the player. In certain embodiments, the audio outputted may be synchronized (or delayed) corresponding to game events, 3D game effects, or other various gameplay functionality associated with gameplay of the EGM 100 or otherwise.

In various embodiments, the adjustments to the audio may be based on other player data or player type data. For example, a player type may comprise a relative height of the player (e.g., a shorter versus a taller player). Thus, when player comprises a shorter player (relative to the height of the player chair 600), the ear tracking zones 314 and 315 may be adjusted accordingly to direct the focal point of the audio outputted by the speakers 380 and 390 "down" toward the player's ears such that the audio sound waves outputted by speakers 380 and 390 are deflected downward toward the player's ears. Conversely, when player comprises a taller player (relative to the height of the player chair 600), the ear tracking zones 314 and 315 may be adjusted accordingly to direct the focal point of the audio sound outputted by the speakers 380 and 390 "up" toward the player's ears such that the audio sound waves outputted by speakers 380 and 390 are deflected upward toward the player's ears.

In another example, the player data or player type may comprise an age of player. In one example embodiment, the EGM 100 may prompt the player, at some portion of commencement of gameplay, to input their age using an input device associated with or of the EGM 100 (or otherwise obtain this data based on player tracking in formation, or by facial recognition systems). The EGM 100 may then use this information to adjust the audio sound characteristics outputted by the speakers 380 and 390 according to a predefined profile (i.e., a profile stored within the EGM 100 or on a central gaming server in communication with the EGM 100 (not shown)) so as to change the properties of the audio commensurate with those properties known to generally be desirous to a particular age group and particular expected ear structures of such older player (e.g., an older player may find the sound characteristics more pleasing if higher frequencies of the audio are amplified/accentuated and lower frequencies are attenuated).

In other example embodiments, the EGM 100 may use clues gleaned from player ear structure data (or the scanning of the head, face, and/or ear structure of the player using the cameras 330 and 340 and/or the player ear locator 320) to detect and determine the approximate age of the player and make automatic audio adjustments accordingly.

In further example embodiments, the EGM 100 may output an audio recording through one or more of the speakers 380 and 390 having a predetermined frequency and prompt the player to enter, using an input device associated with the EGM 100, whether the player is able to hear the outputted audio. In this example embodiment, the EGM 100 may display, on the first display device 300 or elsewhere, a "slider" control of which the player may adjust the frequency range of the outputted audio by the speakers 380 and 390 until the player is satisfied with the outputted audio. In one example embodiment, this slider control mechanism may be part of an audio tuning application provided via the EGM 100 or may be a mobile electronic device (e.g., a smartphone, tablet, laptop, etc.) in communication with the EGM 100. This information may then be saved to the EGM 100 (or the central gaming server, for example) and the audio of a particular game executing on the EGM 100 may be adjusted commensurate with this input.

In various embodiments, when scanning the ear structures of the player, the cameras 330 and 340 may work in conjunction with the processor of the EGM 100 to identify that the player is wearing one or more hearing aid devices. In other embodiments, the player may input this information manually or may be prompted to confirm the detection of the one or more hearing aid devices via input of the first display device 300 or other input device of the EGM 100. That is, in conjunction with the scanning, the EGM 100 may initially identify that the player is wearing one or more hearing aid devices in one or both of the player ears. The EGM 100 may then, to confirm this finding, display a prompt on the first display device 300 (or display device 500, for example) requesting the player to validate that the one or more hearing aid devices are indeed being worn by the player and in which ear(s).

The EGM 100 may then use this information as part of the player ear structure data to adjust the audio outputted by the speakers 380 and 390, respectively, according to an additional predefined profile (i.e., a profile stored within the EGM 100 or on a central gaming server in communication with the EGM 100 (not shown)) so as to change the properties of the audio commensurate with those properties known to generally be optimal to the properties associated with hearing aids. The audio characteristics may be adjusted for which ear (i.e., left ear, right ear, or both ears) of the player is determined to include the respective hearing aid device. In various embodiments, a hearing aid frequency profile may be developed and stored for player on the EGM 100, the central gaming server (not shown), and/or the mobile electronic device (not shown) in communication with the EGM 100. The hearing aid frequency profile may be part of the audio adjustment features discussed herein. In one example, the hearing aid frequency profile may be developed by player using an audio tuning application (which may comprise a sub-application of a gaming establishment application) executing on the personal electronic device (either within the gaming environment or outside the gaming environment) associated with the player. Continuing with the instant example, once the player has stored their hearing aid frequency profile within the mobile electronic device, the mobile electronic device may then transfer this information to the EGM 100 upon the player logging or "carding" in to the EGM 100 when initiating gameplay (or otherwise). In another example embodiment, this functionality may be solely performed on the EGM 100 and stored on the remote device for future use, such that when the player initiates an additional gameplay session at an alternative EGM, this information is transferred by the remote device to the alternative EGM, and the sound characteristics thereof are automatically pre-loaded during the initiation of the gameplay session.

It should be noted that, while these examples refer to the "hearing aid frequency profile," that other embodiments exist where the player does not use any hearing aids and generally wishes to tune the audio produced during gameplay (or otherwise) to their liking. For example, in various embodiments, as mentioned above player ear structure data may be determined and stored within the EGM 100 and/or one or more remote devices such as a central gaming server. The ear structure data may comprise an identified pattern of the specific player's ears (or in alternative embodiments, an aggregate sample of many players ears). Upon initiating a subsequent gameplay session at the EGM 100 (or an alternative EGM within the gaming environment), the player ear structure data may be identified in conjunction with the scanning by the cameras 330 and 340 (and/or the player ear locator 320) and the appropriate audio settings may again be adjusted pursuant to initiating gameplay on the respective EGM.

In certain embodiments, after determining the ear structures of the ears of the player and after determining that the player has physically moved outside of an optimal position for hearing the audio produced by the ones of the speakers 380 and 390 of the EGM 100 (and/or player chair 600), the EGM 100 may display visual and/or output auditory cues to instruct or suggest that the player move back "inside" the optimal position or "range". These auditory and/or visual cues may comprise either spoken words, tones, or instructions presented on one or more of the display devices 300, 400, and/or 500 of the EGM 100 as to which direction (e.g., to the left, right, up, down, and/or a rotational direction) the player should move their head for a more optimal listening experience. In certain such embodiments, the EGM 100 may display or provide these auditory or visual cues may to the player upon determining that the player has moved outside of a range of the cameras 330 and 340 (and/or player ear locator 320) so as to suggest or instruct head and/or body movements to the player to a position where the head and ears of the player is again viewable to the sensors.

GAMING SYSTEM—GENERAL

Figure 5:
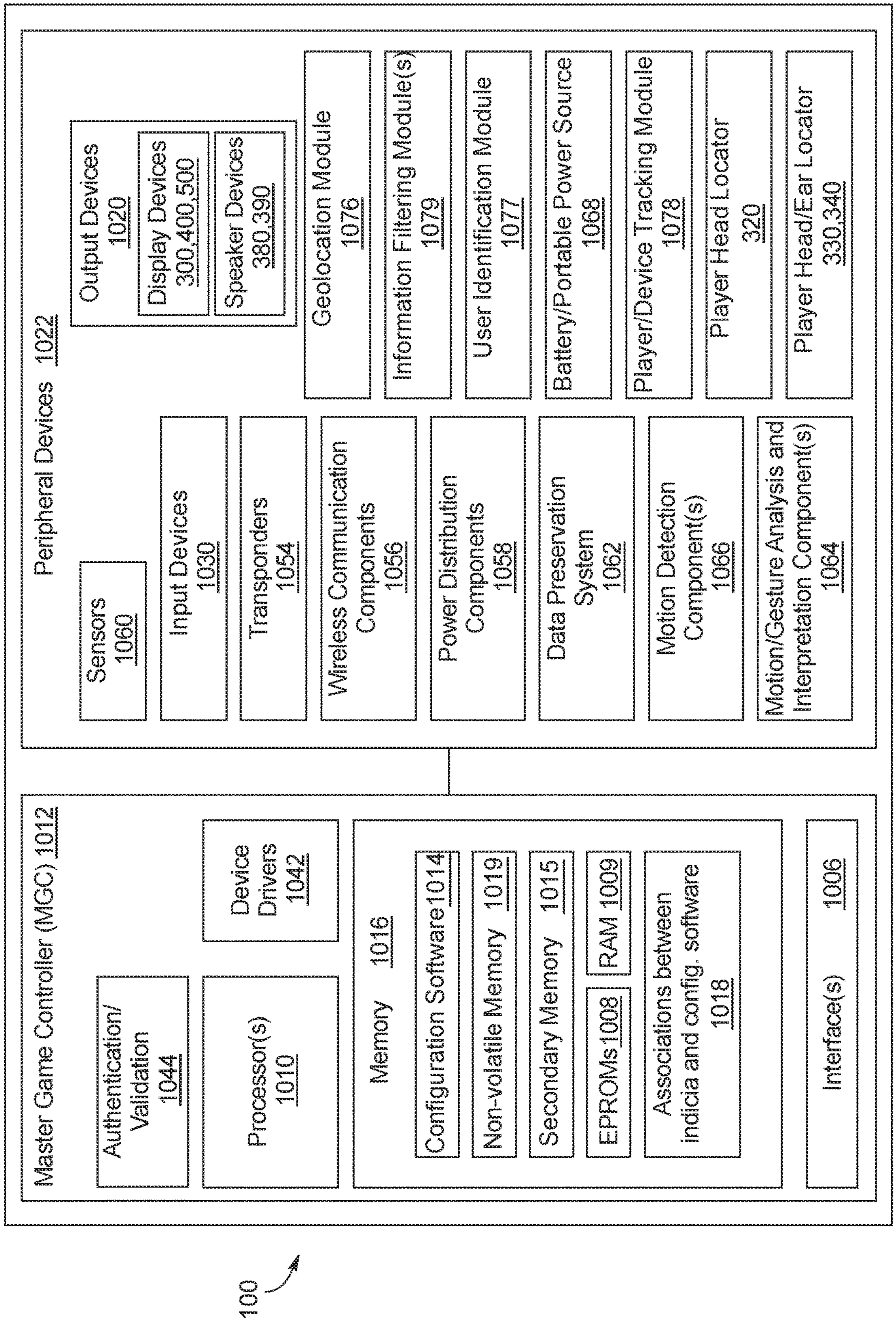
FIG. 5 is a schematic block diagram of one exemplary embodiment of an electronic configuration of the electronic gaming machine of FIG. 1.

Referring now to FIG. 5, in various embodiments, the EGM 100 includes a master game controller 1012 configured to communicate with and to operate with a plurality of peripheral devices 1022 in addition to display devices 300, 400, 500, player ear locator 320, and player ear locators (such as cameras 330 and 340).

The master game controller 1012 (e.g., a master gaming controller) includes one or more processor such as processor 1010. The processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: communicating with a remote source (such as a server that stores authentication information or game information) via a communication interface 1006 of the master gaming controller 1012; converting signals read by an interface to a format corresponding to that used by software or memory of the EGM; accessing memory to configure or reconfigure game parameters in the memory according to indicia read from the EGM 100; communicating with interfaces and the peripheral devices 1022 (such as input/output devices); and/or controlling the peripheral devices 1022. In certain embodiments, one or more components of the master game controller 1012 (such as the at least one processor 1010) reside within a housing of the EGM 100, while in other embodiments at least one component of the master game controller 1012 resides outside of the housing of the EGM 100.

The master game controller 1012 also includes at least one memory device 1016, which includes: volatile memory (e.g., RAM 1009, which may include non-volatile RAM, magnetic RAM, ferroelectric RAM, and any other suitable forms); non-volatile memory 1019 (e.g., disk memory, FLASH memory, EPROMs, EEPROMs, memristor-based non-volatile solid-state memory, etc.); unalterable memory (e.g., EPROMs 1008); read-only memory; and/or a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM 100 disclosed herein. In certain embodiments, the at least one memory device 1016 resides within the housing of the EGM 100 (described below), while in other embodiments at least one component of the at least one memory device 1016 resides outside of the housing of the EGM 100.

The at least one memory device 1016 is configured to store, for example: configuration software 1014, such as all the parameters and settings for a game playable on the EGM 100; associations 1018 between configuration indicia read from an EGM 100 with one or more parameters and settings; communication protocols configured to enable the at least one processor 1010 to communicate with the peripheral devices 1022; and/or communication transport protocols (such as TCP/IP, USB, Firewire, IEEE1394, Bluetooth, IEEE 802.11x (IEEE 802.11 standards), hiperlan/2, HomeRF, etc.) configured to enable the EGM 100 to communicate with local and non-local devices using such protocols. In one implementation, the master game controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM 100 to control the EGM 100. The at least one memory device 1016 of the EGM 100 also stores other operating data, such as image data, audio data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM 100 through any suitable data network described above (such as an Internet or intranet).

The at least one memory device 1016 also stores a plurality of device drivers 1042. Examples of different types of device drivers include device drivers for EGM components and device drivers for the peripheral devices 1022. Typically, the device drivers 1042 utilize various communication protocols that enable communication with a particular physical device. The device driver abstracts the hardware implementation of that device. For example, a device driver may be written for each type of card reader that could potentially be connected to the EGM 100. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (Wi-Fi), etc. In one embodiment, when one type of a particular device is exchanged for another type of the particular device, the at least one processor of the EGM 100 loads the new device driver from the at least one memory device to enable communication with the new device. For instance, one type of card reader in the EGM 100 may be replaced with a second different type of card reader when device drivers for both card readers are stored in the at least one memory device.

In certain embodiments, the software units stored in the at least one memory device 1016 may be upgraded as needed. For instance, when the at least one memory device 1016 is a hard drive, new games, new game options, new parameters, new settings for existing parameters, new settings for new parameters, new device drivers, and new communication protocols may be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 may be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units may be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

Figure 2:
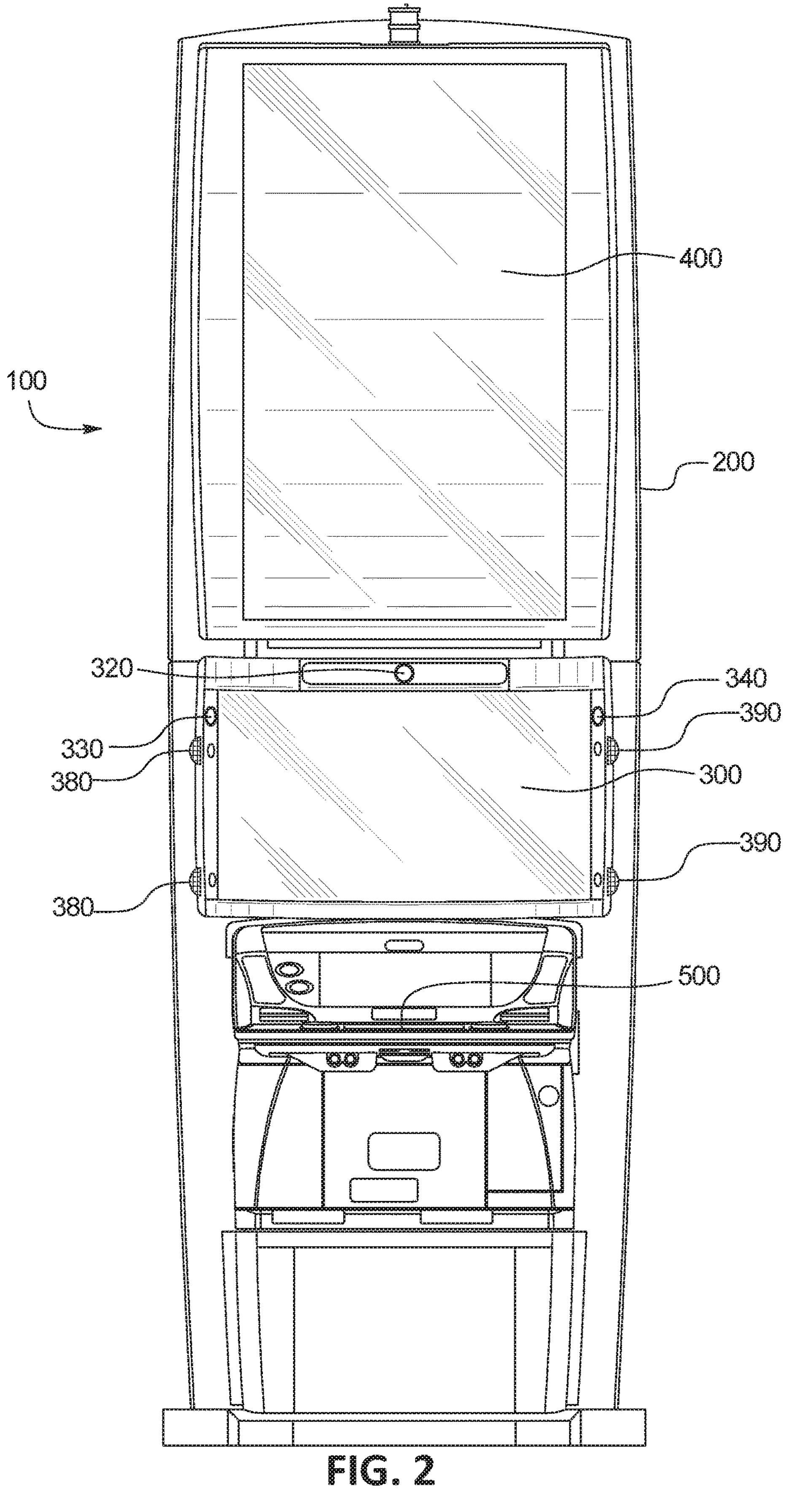
FIG. 2 is a front view of the electronic gaming machine of FIG. 1.

In certain embodiments, in addition to the input, output and other components described in the first section above, the peripheral devices 1022 include several device interfaces, such as: at least one output device 1020 including at least one display device (e.g., see display devices 300, 400, 500 of FIG. 1-3; at least one input device 1030 (which may include contact and/or non-contact interfaces); at least one transponder 1054; at least one wireless communication component 1056; at least one wired/wireless power distribution component 1058; at least one sensor 1060; at least one data preservation component(s) 1062; at least one motion/gesture analysis and interpretation component 1064; at least one motion detection component 1066; at least one portable power source 1068; at least one geolocation module 1076; at least one user identification module 1077; at least one player/device tracking module 1078; and at least one information filtering module 1079.

The at least one output device 1020 includes at least one display device 300, 400, 500 configured to display any game(s) displayed by the EGM 100 and any suitable information associated with such game(s). Additionally, the at least one output device 1020 includes at least one of the speakers 380, 390 configured to reproduce audio associated with any game(s) executed by the EGM 100 and any suitable information associated with such game(s). In certain embodiments, the display devices and speakers are connected to or mounted on a housing of the EGM 100. In various embodiments, the display devices serve as digital glass configured to advertise certain games or other aspects of the gaming establishment in which the EGM is located. In various embodiments, the EGM 100 includes one or more of the following display devices: a central display device; (b) a player tracking display configured to display various information regarding a player's player tracking status (as described below); a secondary or upper display device in addition to the central display device and the player tracking display; a credit display configured to display a current quantity of credits, amount of cash, account balance, or the equivalent; and a bet display configured to display an amount wagered for one or more plays of one or more games. For example, the exemplary EGM 100 illustrated in FIG. 1 includes a first display device 300, a credit display, and a bet display.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM 100 are configured to display one or more game and/or non-game images, symbols, and indicia. In certain embodiments, the display devices of the EGM 100 are configured to display any suitable visual representation or exhibition of the movement of objects; dynamic lighting; video images; images of people, characters, places, things, and faces of cards; and the like. In certain embodiments, the display devices of the EGM 100 are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM 100 receives an actuation of a cashout device (described below), the EGM 100 causes the payout device to provide a payment to the player. In one embodiment, the payout device is one or more of: a ticket printer and dispenser configured to print and dispense a ticket or credit slip associated with a monetary value, wherein the ticket or credit slip may be redeemed for its monetary value via a cashier, a kiosk, or other suitable redemption system; a bill dispenser configured to dispense paper currency; a coin dispenser configured to dispense coins or tokens (such as into a coin payout tray); and any suitable combination thereof. For example, the exemplary EGM 100 as illustrated in FIG. 1 may include a ticket printer and dispenser.

In certain embodiments, the at least one output device 1020 includes one or more sound generating devices controlled by one or more sound cards. In one such embodiment, the sound generating device includes one or more speakers or other sound generating hardware and/or software configured to generate sounds, such as by playing music for any games or by playing music for other modes of the EGM 100, such as an attract mode. For example, the exemplary EGM 100 illustrated in FIG. 1 includes a plurality of speakers 380 and 390. In another such embodiment, the EGM 100 provides dynamic sounds coupled with attractive multimedia images displayed on one or more of the display devices to provide an audio-visual representation or to otherwise display full-motion video with sound to attract players to the EGM 100. In certain embodiments, the EGM 100 displays a sequence of audio and/or visual attraction messages during idle periods to attract potential players to the EGM 100. The videos may be customized to provide any appropriate information.

The at least one input device 1030 may include any suitable device that enables an input signal to be produced and received by the at least one processor 1010 of the EGM 100.

In one embodiment, the at least one input device 1030 includes a payment device configured to communicate with the at least one processor of the EGM to fund the EGM. In certain embodiments, the payment device includes one or more of: a bill acceptor into which paper money is inserted to fund the EGM; a ticket acceptor into which a ticket or a voucher is inserted to fund the EGM; a coin slot into which coins or tokens are inserted to fund the EGM; a reader or a validator for credit cards, debit cards, or credit slips into which a credit card, debit card, or credit slip is inserted to fund the EGM; a player identification card reader into which a player identification card is inserted to fund the EGM; or any suitable combination thereof. The example EGM 100 illustrated in FIG. 1 may include a combined bill and ticket acceptor and a coin slot.

In certain embodiments, the at least one input device 1030 includes at least one wagering or betting device. In various embodiments, the one or more wagering or betting devices are each: a mechanical button supported by the housing of the EGM 100 (such as a hard key or a programmable soft key), or an icon displayed on a display device of the EGM (described below) that is actuatable via a touch screen of the EGM (described below) or via use of a suitable input device of the EGM 100 (such as a mouse or a joystick). One such wagering or betting device is a maximum wager or bet device that, when actuated, causes the EGM 100 to place a maximum wager on a play of a game. Another such wagering or betting device is a repeat bet device that, when actuated, causes the EGM 100 to place a wager that is equal to the previously-placed wager on a play of a game. A further such wagering or betting device is a bet one device that, when actuated, causes the EGM 100 to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: a mechanical button supported by the housing of the EGM 100 (such as a hard key or a programmable soft key), or an icon displayed on a display device of the EGM (described below) that is actuatable via a touch screen of the EGM (described below) or via use of a suitable input device of the EGM 100 (such as a mouse or a joystick). After a player appropriately funds the EGM 100 and places a wager, the EGM 100 activates the game play activation device to enable the player to actuate the game play activation device to initiate a play of a game on the EGM 100 (or another suitable sequence of events associated with the EGM 100). After the EGM 100 receives an actuation of the game play activation device, the EGM 100 initiates the play of the game. The exemplary EGM 100 illustrated in FIG. 1 may include a game play activation device in the form of a game play initiation button. In other embodiments, the EGM 100 begins game play automatically upon appropriate funding rather than upon utilization of the game play activation device.

In other embodiments, the at least one input device 1030 includes a cashout device. In various embodiments, the cashout device is: a mechanical button supported by the housing of the EGM 100 (such as a hard key or a programmable soft key), or an icon displayed on a display device of the EGM 100 that is actuatable via a touch screen of the EGM 100 or via use of a suitable input device of the EGM 100 (such as a mouse or a joystick). When the EGM 100 receives an actuation of the cashout device from a player and the player has a positive (i.e., greater-than-zero) credit balance, the EGM 200 initiates a payout associated with the player's credit balance. The exemplary EGM 100 illustrated in FIG. 1 may include a cashout device in the form of a cashout button.

In various embodiments, the at least one input device 1030 includes a plurality of buttons that are programmable by the EGM 100 operator to, when actuated, cause the EGM 100 to perform particular functions. For instance, such buttons may be hard keys, programmable soft keys, or icons displayed on a display device of the EGM 100 that are actuatable via a touch screen of the EGM 100 or via use of a suitable input device of the EGM 100 (such as a mouse or a joystick). The exemplary EGM 100 illustrated in FIG. 1 may include a plurality of such buttons.

In certain embodiments, the at least one input device 1030 includes a touch-screen coupled to a touch-screen controller or other touch-sensitive display overlay to enable interaction with any images displayed on a display device. One such input device is a conventional touch-screen button panel. The touch-screen and the touch-screen controller are connected to a video controller. In these embodiments, signals are input to the EGM 100 by touching the touch screen at the appropriate locations.

In embodiments including a player tracking system, the at least one input device 1030 includes a card reader in communication with the at least one processor of the EGM 100. The exemplary EGM 100 illustrated in FIG. 1 may include a card reader. The card reader is configured to read a player identification card inserted into the card reader.

The at least one wireless communication component 1056 includes one or more communication interfaces having different architectures and utilizing a variety of protocols, such as (but not limited to) 802.11 (Wi-Fi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM 100. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM 100, such as one or more rechargeable power sources (e.g., rechargeable batteries) located at the EGM 100.

In certain embodiments, in addition to the components described in the first section above, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM 100 (in addition to the detections described above); detecting the presence and/or identity of various persons (e.g., players, casino employees, etc.), devices (e.g., user input devices), and/or systems within a predetermined proximity to the EGM 100.

The at least one data preservation system 1062 is configured to detect or sense one or more events and/or conditions that, for example, may result in damage to the EGM 100 and/or that may result in loss of information associated with the EGM 100. Additionally, the data preservation system 1062 may be operable to initiate one or more appropriate action(s) in response to the detection of such events/conditions.

In addition to the player eye or head tracker 320, the EGM 100 of the present disclosure may also include at least one motion/gesture analysis and interpretation component 1064 configured to analyze and/or interpret information relating to detected player movements and/or gestures to determine appropriate player input information relating to the detected player movements and/or gestures with regard to both images and sound generated by the EGM 100. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one geolocation module 1076 is configured to acquire geolocation information from one or more remote sources and use the acquired geolocation information to determine information relating to a relative and/or absolute position of the EGM 100. For example, in one implementation, the at least one geolocation module 1076 is configured to receive GPS signal information for use in determining the position or location of the EGM 100. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM 100.

The at least one user identification module 1077 is configured to determine the identity of the current user or current owner of the EGM 100. For example, in one embodiment, the current user is required to perform a login process at the EGM 100 in order to access one or more features. Alternatively, the EGM 100 is configured to automatically determine the identity of the current user based on one or more external signals, such as an RFID tag or badge worn by the current user and that provides a wireless signal to the EGM 100 that is used to determine the identity of the current user. In at least one embodiment, various security features are incorporated into the EGM 100 to prevent unauthorized users from accessing confidential or sensitive information.

The at least one information filtering module 1079 is configured to perform filtering (e.g., based on specified criteria) of selected information to be displayed at one or more displays 300, 400, 500 of the EGM 100.

In various embodiments, the EGM 100 includes a plurality of communication ports configured to enable the at least one processor of the EGM 100 to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

In certain embodiments, the EGM 100 is a device that has obtained approval from a regulatory gaming commission, and in other embodiments, the EGM 100 is a device that has not obtained approval from a regulatory gaming commission.

The EGMs described above are merely examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (sometimes referred to herein as "primary games") and/or any secondary or bonus games or other functions (sometimes referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a remote processor, central server, central controller, or remote host and a changeable EGM, the at least one memory device of the remote processor, central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the remote processor, central server, central controller, or remote host is configured to communicate one or more of the stored executable game programs to the at least one processor of the changeable EGM. In different embodiments, a stored executable game program is communicated or delivered to the at least one processor of the changeable EGM by: embedding the executable game program in a device or a component (such as a microchip to be inserted into the changeable EGM); writing the executable game program onto a disc or other media; or uploading or streaming the executable game program over a data network (such as a dedicated data network). After the executable game program is communicated from the central server, central controller, remote processors, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the EGM 100 randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the EGM 100 generates the game outcome(s) and/or the award(s) to be provided based on the associated probabilities. In these embodiments, since the EGM 100 generates game outcomes and/or awards randomly or based on one or more probability calculations, there is no certainty that the EGM 100 will ever provide any specific game outcome and/or award.

As noted above, in various embodiments, the EGM 100 includes one or more executable game programs executable by at least one processor of the EGM 100 to provide one or more primary games and one or more secondary games. The primary game(s) and the secondary game(s) may comprise any suitable games and/or wagering games, such as, but not limited to: electro-mechanical, video slot or spinning reel type games; video card games such as video draw poker, multi-hand video draw poker, other video poker games, video blackjack games, and video baccarat games; video keno games; video bingo games; and video selection games.

Figure 6:
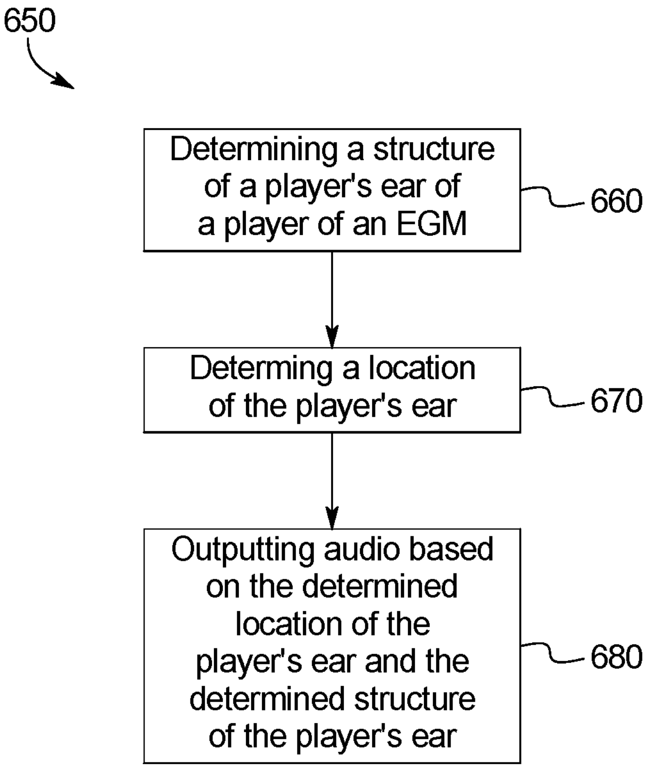
FIG. 6 is a flowchart diagram illustrating an exemplary method for optimizing audio generated by the gaming system of FIG. 1.

Now referring to FIG. 6, a flowchart diagram illustrating an example method 650 of acoustical optimization in accordance with the present disclosure is generally illustrated. The method 650 generally includes: (1) determining a structure of a player's ear of a player of an EGM as indicated by block 660; (2) determining a location of the player's ear as indicated by block 670; and (3) outputting the audio further based on the determined location of the player's ear and the determined structure of the player's ear.

In conjunction with the method 650, in various embodiments, the method includes determining the structure of the player's ear by taking a picture of the player's ear using a camera.

In conjunction with the method 650, in various embodiments, the method includes determining the structure of the player's ear by receiving player ear structure data associated with the structure of the player's ear.

In conjunction with the method 650, in various embodiments, the optimization of the acoustical characteristics further includes synchronizing the sound produced by ones of the plurality of speakers integrated into the cabinet with the sound produced by ones of the plurality of speakers integrated into the headrest of the seat of the EGM.

In conjunction with the method 650, in various embodiments, optimization of the acoustical characteristics further includes adjusting a focal beam of the sound produced by ones of the plurality of speakers to direct the sound substantially toward the user's ears.

In conjunction with the method 650, in various embodiments, the optimization of the acoustical characteristics further includes enhancing a sound quality of the sound produced by ones of the plurality of speakers according to at least one of a volume level and a channel separation, among other audio properties, between the ones of the plurality of speakers.

The flowcharts and block diagrams in the above figures illustrate the architecture, functionality, and operation of possible implementations of apparatuses, systems, methods and/or computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A method for operating a gaming system, said method comprising:

receiving, from a remote central server, ear structure data associated with an ear of a player of an electronic gaming machine, the ear structure data relating to a previously determined structure of the player's ear, wherein the previously determined structure of the player's ear comprises a size and a shape of the player's ear;

determining, via an object sensor, a location of the player's ear; and adjusting, via a repositioning device, a position of a sound producing device and outputting, via the sound producing device, audio based on the received ear structure data comprising the previously determined structure of the player's ear and the determined location of the player's ear.

2. The method of claim 1, wherein the size and the shape of the player's ear comprises a size and a shape of at least three visible parts of the player's ear.

3. The method of claim 1, which comprises responsive to receiving the ear structure data, enabling the electronic gaming machine to determine a current structure of the player's ear comprising a current size and a current shape of the player's ear.

4. The method of claim 1, wherein determining the location of the player's ear comprises using a camera to obtain an image of a location of the player's ear relative to the electronic gaming machine.

5. The method of claim 1, which comprises outputting the audio based on the previously determined structure of the player's ear and the determined location of the player's ear in real time.

6. The method of claim 1, wherein the sound producing device comprises a speaker, and wherein outputting the audio comprises causing the speaker of the electronic gaming machine to output the audio in a determined direction based on the previously determined structure of the player's ear and the determined location of the player's ear.

7. The method of claim 1, wherein the sound producing device comprises a speaker of a player chair, and wherein outputting the audio comprises causing the speaker of the player chair associated with the electronic gaming machine to output the audio in a determined direction based on the previously determined structure of the player's ear and the determined location of the player's ear.

8. The method of claim 1, wherein outputting audio based on the previously determined structure of the player's ear and the determined location of the player's ear comprises directing a focal point of the audio toward the player's ear.

9. The method of claim 1, wherein outputting audio based on the previously determined structure of the player's ear and the determined location of the player's ear comprises one of: changing a direction of a focal point of the audio; changing a volume of the audio; changing a tone of the audio; changing a pitch of the audio; changing a frequency of the audio; changing a wavelength of the audio; changing an amplitude of the audio; changing a bass level of the audio; changing a treble level of the audio; changing a musical instrument of the audio; changing a spoken word of the audio; changing an equalization of the audio; changing a sound pressure level of the audio; changing a sonic texture of the audio; changing a duration of the audio; and adding an ambient noise cancellation sound to the audio.

10. An electronic gaming machine comprising:
- a cabinet;
- an object sensor supported by the cabinet;
- a sound producing device supported by the cabinet;
- a processor; and
- a memory device that stores a plurality of instructions, which when executed by the processor, cause the processor to:
  - determine a structure of a player's ear of a player of the electronic gaming machine, wherein the structure of the player's ear comprises a size and a shape of the player's ear;
  - operate with the object sensor to determine a location of the player's ear; and
  - operate with the sound producing device to output audio based on the determined structure of the player's ear and the determined location of the player's ear, wherein the sound producing device comprises a repositioning device configured to adjust a position of the sound producing device based on the determined structure of the player's ear and the determined location of the player's ear.

11. The electronic gaming machine of claim 10, wherein the plurality of instructions, when executed by the processor, cause the processor to operate with the object sensor to obtain an image of the player's ear to determine the structure of the player's ear.

12. The electronic gaming machine of claim 10, wherein the plurality of instructions, when executed by the processor, cause the processor to determine the structure of the player's ear by receiving player ear structure data associated with the structure of the player's ear.

13. The electronic gaming machine of claim 10, wherein the sound producing device comprises a plurality of speakers, and wherein the plurality of instructions, when executed by the processor, cause the processor operate with one of the speakers to output the audio based on the determined structure of the player's ear and the determined location of the player's ear in real time.

14. The electronic gaming machine of claim 10, wherein the plurality of instructions, when executed by the processor, cause the processor to operate with the sound producing device to direct a focal point of the audio toward the user's ear.

15. The electronic gaming machine of claim 10, wherein the plurality of instructions, when executed by the processor, cause the processor to operate with the object sensor to detect a hearing aid worn by the player.

16. The electronic gaming machine of claim 15, wherein the plurality of instructions, when executed by the processor, cause the processor to operate with the operate with the sound producing device to output audio based on a detected hearing aid worn by the player.

17. A gaming system comprising:
- a player chair comprising a sound producing device; and
- an electronic gaming machine comprising:
  - a cabinet;
  - an object sensor supported by the cabinet;
  - a sound producing device supported by the cabinet;
  - a processor; and
  - a memory device that stores a plurality of instructions, which when executed by the processor, cause the processor to:
  - determine a structure of a player's ear of a player on the player chair, wherein the structure of the player's ear comprises a size and a shape of the player's ear;
  - operate with the object sensor to determine a location of the player's ear; and
  - operate with the sound producing devices of the player chair and of the electronic gaming machine to output audio based on the determined structure of the player's ear and the determined location of the player's ear, wherein the sound producing device of the player chair comprises a repositioning device configured to adjust a position of the sound producing device of the player chair based on the determined structure of the player's ear and the determined location of the player's ear.

18. The gaming system of claim 17, wherein determining the structure of the player's ear comprises using the object sensor to obtain an image of the player's ear.

19. The gaming system of claim 17, wherein determining the structure of the player's ear comprises receiving player ear structure data associated with the structure of the player's ear.

* * * * *